United States Patent
Debruycker (10) Patent No.: US 7,303,058 B2
(45) Date of Patent: Dec. 4, 2007

(54) TELESCOPING SPOUT FOR AGRICULTURAL HARVESTER

(76) Inventor: Ryan Debruycker, 2745 Crabtree St., Bozeman, MT (US) 59718

( * ) Notice: Subject to any disclaimer, the term of this patent is extended or adjusted under 35 U.S.C. 154(b) by 327 days.

(21) Appl. No.: 11/112,161

(22) Filed: Apr. 22, 2005

(65) Prior Publication Data

US 2006/0016164 A1    Jan. 26, 2006

Related U.S. Application Data

(60) Provisional application No. 60/565,119, filed on Apr. 23, 2004.

(51) Int. Cl.
*A01C 7/20* (2006.01)
*B65G 11/08* (2006.01)
*B65G 11/10* (2006.01)

(52) U.S. Cl. ...................... 193/25 E; 460/114

(58) Field of Classification Search ........... 460/114; 414/502, 526, 489; 222/105, 523, 502, 530; 239/657; 198/530, 632; 56/16.6, 14.6; 193/25 E, 193/16
See application file for complete search history.

(56) References Cited

U.S. PATENT DOCUMENTS

| | | | | |
|---|---|---|---|---|
| 1,185,459 A | * | 5/1916 | Worley | 138/120 |
| 1,981,413 A | * | 11/1934 | Goodfellow | 138/92 |
| 2,490,241 A | * | 12/1949 | Smith et al. | 414/502 |
| 2,772,764 A | * | 12/1956 | McClellan | 193/4 |
| 2,997,150 A | * | 8/1961 | Emanuelson | 193/25 E |
| 3,011,612 A | * | 12/1961 | Olsen | 193/22 |
| 3,379,219 A | * | 4/1968 | Schuh et al. | 138/118 |
| 3,391,778 A | * | 7/1968 | Lasiter | 198/530 |
| 3,807,540 A | * | 4/1974 | Boulet | 193/9 |
| 3,949,850 A | * | 4/1976 | Schumm | 193/25 E |
| 4,320,860 A | * | 3/1982 | Koch et al. | 222/502 |
| 4,821,861 A | * | 4/1989 | Shanahan | 193/25 E |
| 5,601,181 A | * | 2/1997 | Lindhorst | 198/536 |
| 6,594,979 B2 | * | 7/2003 | Krone et al. | 56/16.6 |
| 6,964,551 B1 | * | 11/2005 | Friesen | 414/526 |

\* cited by examiner

*Primary Examiner*—Árpád Fábián Kovács
(74) *Attorney, Agent, or Firm*—Merchant & Gould P.C.

(57) ABSTRACT

An adjustable height spout for an agricultural harvester may be remotely actuated by an operator. The spout may be positioned to match a height of a receptacle into which grain from the harvester is being transferred. An agricultural harvester including an adjustable height spout which may be actuated remotely by an operator.

15 Claims, 7 Drawing Sheets

TELESCOPING SPOUT FOR AGRICULTURAL HARVESTER

CROSS-REFERENCE TO RELATED PROVISIONAL APPLICATION

The present application claims priority to U.S. Provisional Application 60/565,119, filed on Apr. 23, 2004, the disclosure of which is incorporated herein by reference.

TECHNICAL FIELD

The present invention relates generally to material off-loading devices, and more specifically to spouts for off-loading harvested materials from agricultural harvesting equipment.

BACKGROUND

Agricultural harvesting equipment often includes some form of on-board grain or other harvested material storage. Typically, this on-board storage is only for temporary storage of material and needs to be periodically unloaded during a day's harvesting operation. In order to keep production efficiency as high as possible, this off-loading of material may be accomplished in the field without stopping the operation of the harvester. A truck or farm wagon (a discharge vehicle) may be pulled alongside the harvester to receive the material and the harvester may be equipped with a flexible spout that can be positioned above the discharge vehicle. Material can then be discharged from the on-board storage through the spout by an auger or similar device and into the discharge vehicle, while the harvester continues to collect additional material.

Loss of off-loaded material may occur when the spout is positioned too high above the discharge vehicle. Wind may blow material from the discharge stream and out of the discharge vehicle onto the ground. Also, vertical separation between the spout and the discharge vehicle may cause operator error in the alignment of the spout and the discharge vehicle. Discharge vehicles may vary in height, and the height of a discharge spout above the ground may vary between different models and brands of harvesters. It is desirable to provide improvements to the discharge spout to accommodate different height of vehicles and harvesters.

SUMMARY

The present invention relates to an extendable/retractable spout for use with an agricultural harvester. The spout permits the position of a lower end of the spout to be adjusted in height to match the height of a truck or wagon into which grain is being transferred. The present invention further relates to a harvester including an extendable/retractable spout that can be actuated remotely by an operator.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
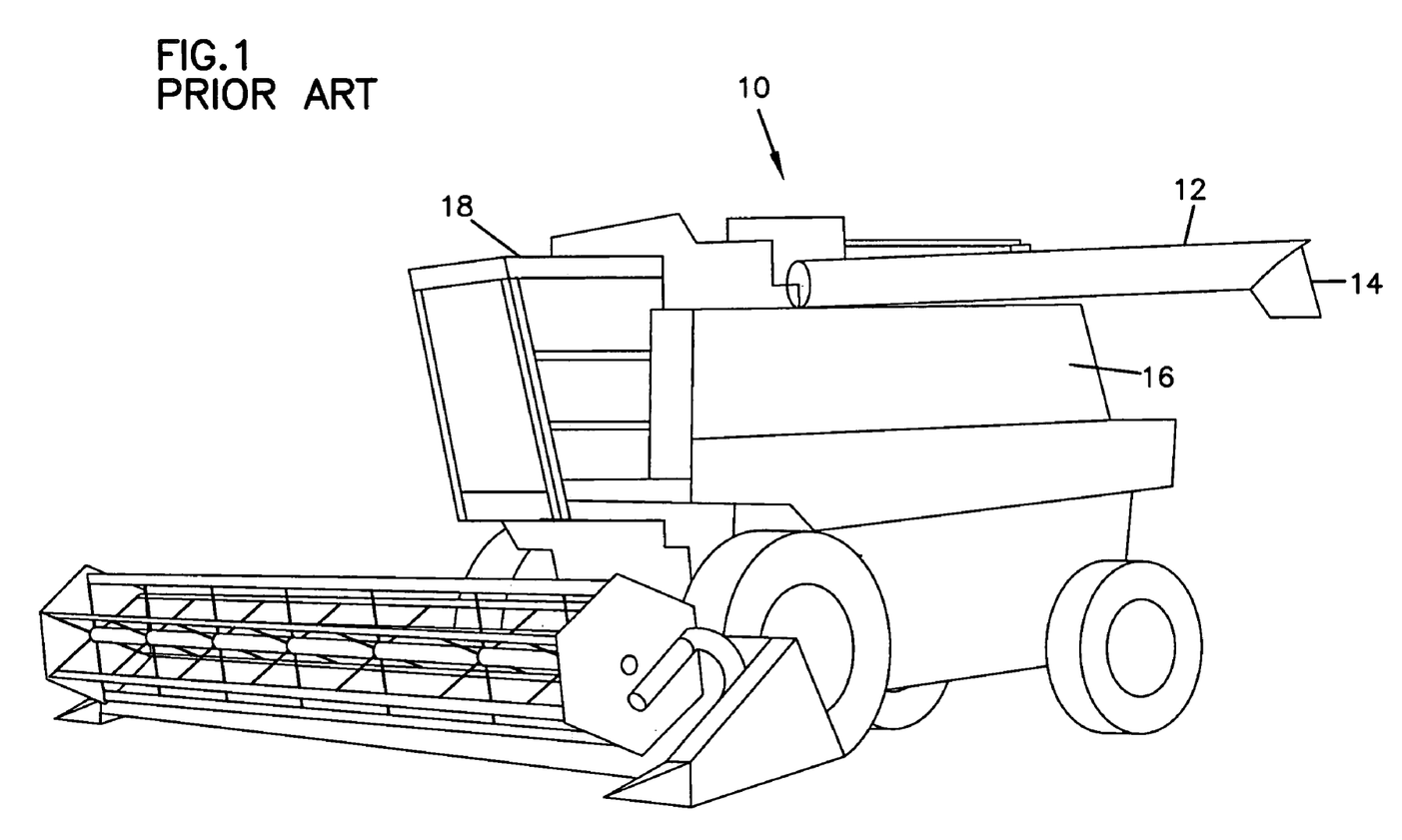
FIG. 1 is a perspective view of a prior art combine harvester.

FIG. 1 shows a prior art agricultural harvester 10 with a movable discharge auger 12 having a fixed spout 14. Auger 12 can be moved sideways through an arc about a pivot point defined on an upper portion of harvester body 16. Within harvester body 16 is a temporary on-board grain storage bin for holding grain or other harvested material collected by harvester 10. An operator's position or cab 18 is located remotely from either auger 12 or spout 14.

Figure 2:
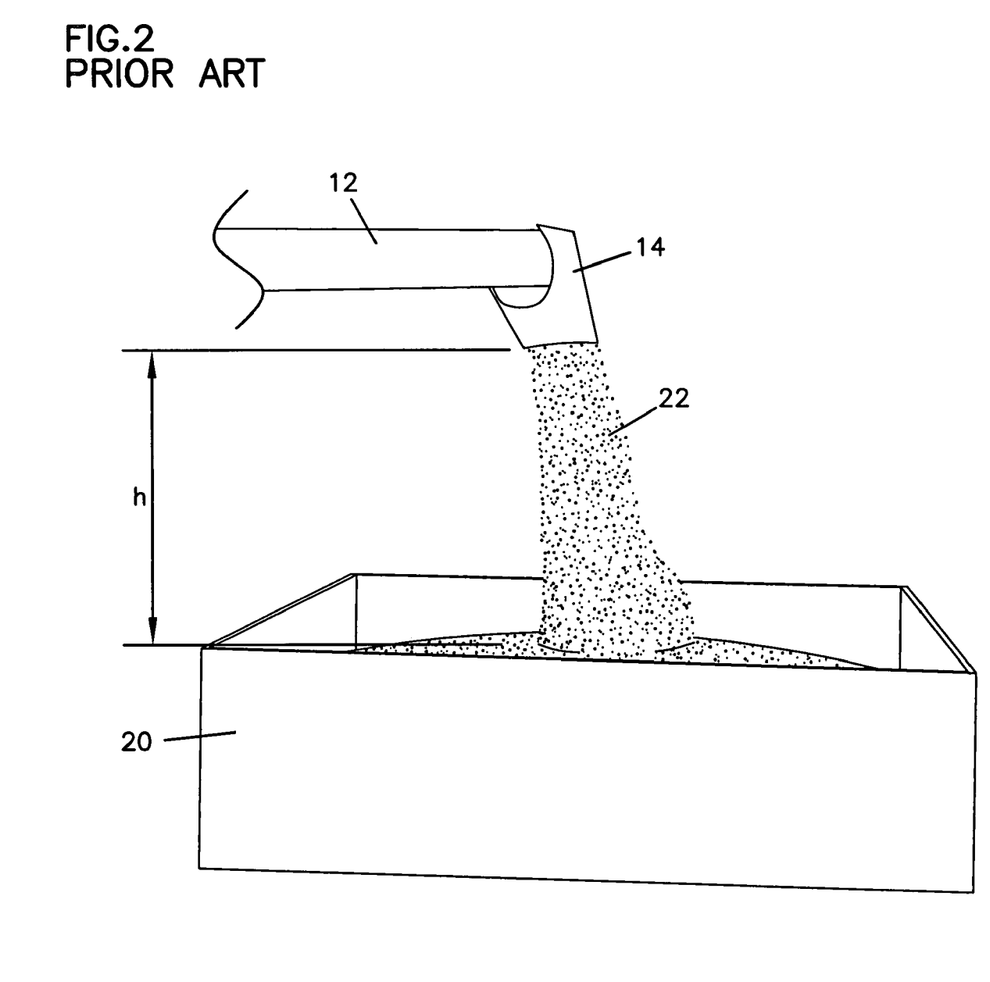
FIG. 2 is a perspective view of a prior art harvester discharging grain into a farm wagon.

FIG. 2 is a view sideways from cab 18 of harvester 10, with auger 12 positioned so that spout 14 is above a farm wagon 20. Grain 22 is being discharged from harvester 10 into wagon 20. A lower end of spout 14 is located a distance h above wagon 20. This distance h may allow grain 22 falling from spout 14 to be scattered by wind and end up on the ground instead of in wagon 20. As can be seen in FIG. 2, auger 12 may be swung forward enough so that spout 14 is generally even with cab 18, permitting an operator to see where spout 14 is located with respect to wagon 20. However, distance h may create an optical illusion for the operator, and cause the operator to misalign spout 14. Such misalignment may cause grain 22 to be discharged onto the ground.

Figure 3:
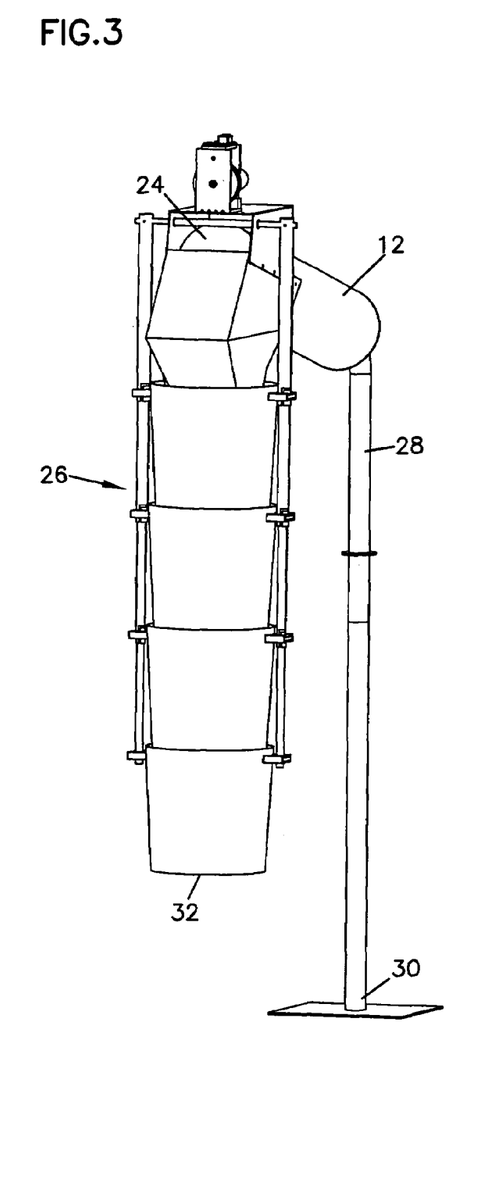
FIG. 3 is a perspective view of a grain discharge mechanism with an extendable spout according to the present invention.

Referring now to FIG. 3, auger 12 extends as part of a discharge mechanism 28 which has an end 30 within the on-board grain storage bin of harvester 10. At a distal or discharge end 24 of auger 12 is mounted an extendable and retractable spout 26, which extends downward in place of spout 14. As shown in FIG. 3, extendable spout 26 is at a point of greatest extension, meaning that a lower end 32 of spout 26 is at a point closest to the ground. This lowering of end 32 permits an operator to reduce or eliminate the distance h that grain 22 must drop before entering within wagon 22 or a truck or similar grain transport.

Figure 4:
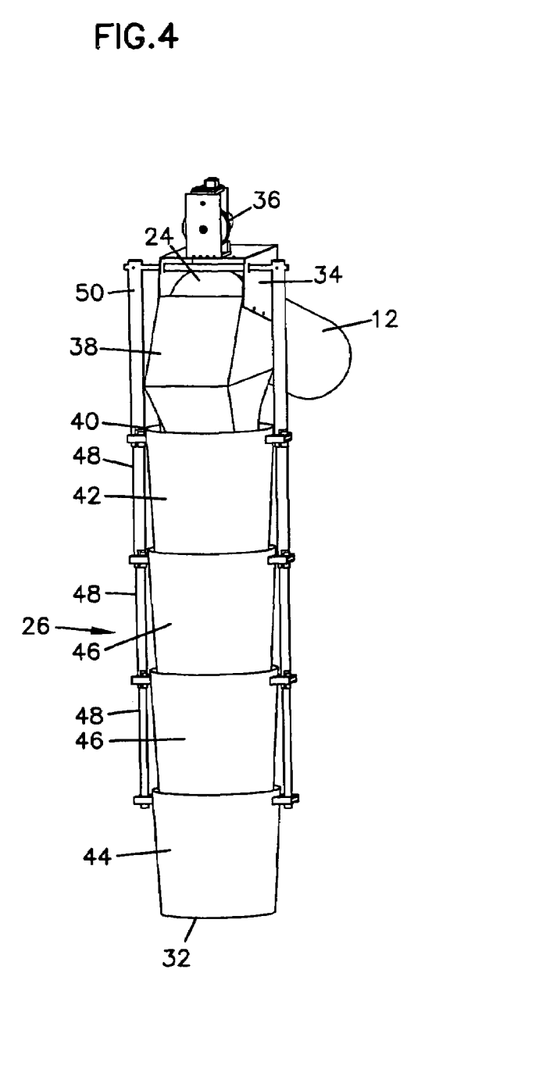
FIG. 4 is a perspective view of the extendable spout of FIG. 3, with the spout fully extended.
Figure 5:
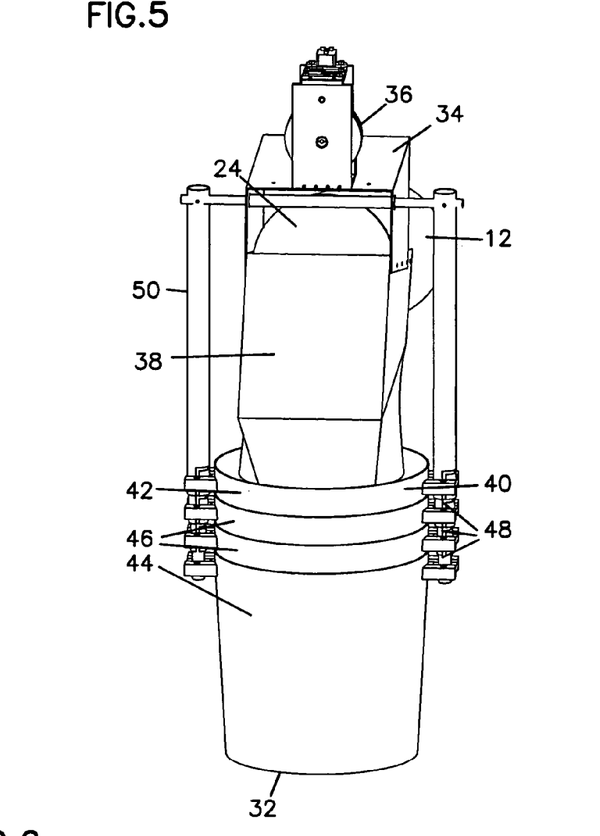
FIG. 5 is a perspective view of the extendable spout of FIG. 4, with the spout fully retracted.

Referring now to FIG. 4, retractable spout 24 includes a drive mechanism 36 and a drive mechanism mount 34 mounted above distal end 24 of auger 12. An interface 38 provides a transition for grain 22 to exit distal end 24 and enter an upper end 40 of a top most or upper nesting cone 42. Spout 24 includes a bottom most or lower nesting cone 44 and one or more intermediate nesting cones 46. Alongside cones 42, 44 and 46 are telescoping tubes 48. Tubes 48 are hollow and vary in diameter with a largest diameter tube 48 mounted adjacent cone 42, and decreasing in diameter to the smallest diameter tube 48 mounted adjacent cone 44. The higher mounted tubes 48 have a large enough inner diameter for the next lowest tube 48 to telescope within. As seen in FIG. 5, spout 24 is shown in retracted position with cones 42, 44 and 46 nesting within each other and tubes 48 telescoped within each other. An upper hollow tube mount 50 connects tubes 48 to mount 34 and has a large enough inner diameter to permit the largest tube 48 to telescope within. Note that in the extended position shown in FIG. 4, the cones remain overlapped with each other to provide a generally continuous grain passage from auger 12 to lower end 32.

Figure 6:
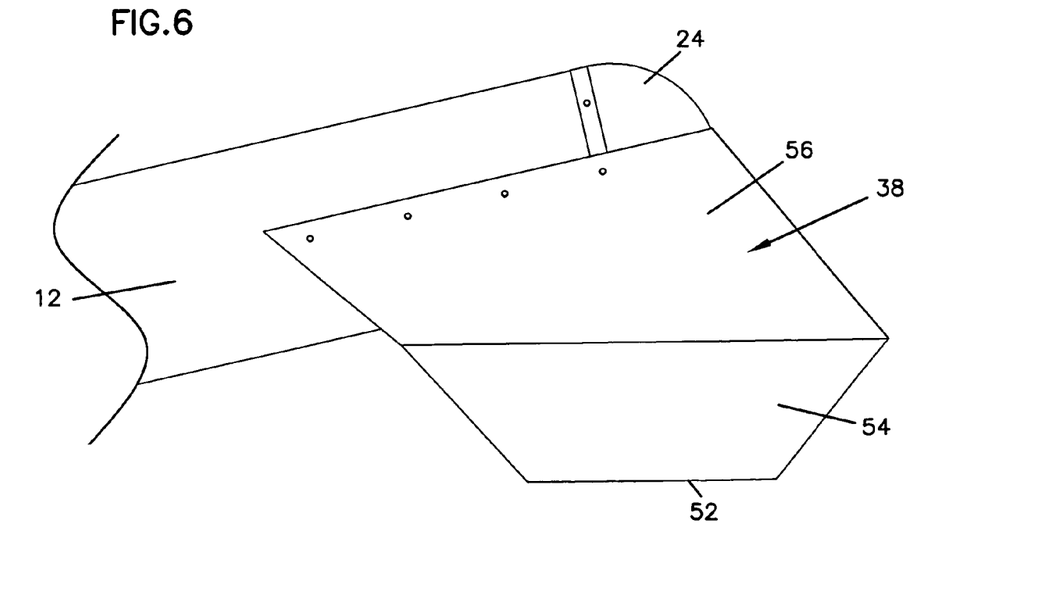
FIG. 6 is a side view of a distal end of the discharge mechanism of FIG. 3, with an interface for the extendable spout according to the present invention.

Referring now to FIG. 6, interface 38 includes an upper portion 56 configured to fit closely about auger 12 adjacent distal end 24. While not needed to seal against auger 12, a close fit is desirable to reduce grain loss or blow by during discharge. Below upper portion 56 is a tapered portion 54 leading to a lower grain exit 52 through which grain 22 flows to enter upper cone 42. The size of upper portion 56 may be determined based on the size of auger 12 and distal end 24 and whatever opening is formed for grain at distal end 24. Tapered portion 54 and grain exit 52 should be sized to provide adequate flow rates based on the expected maximum grain volume and characteristics. Any significant constriction of grain flow caused by tapered portion 54 may materially add to the weight of grain within auger 12 and cause back ups within auger 12 which may damage equipment or grain.

Figure 7:
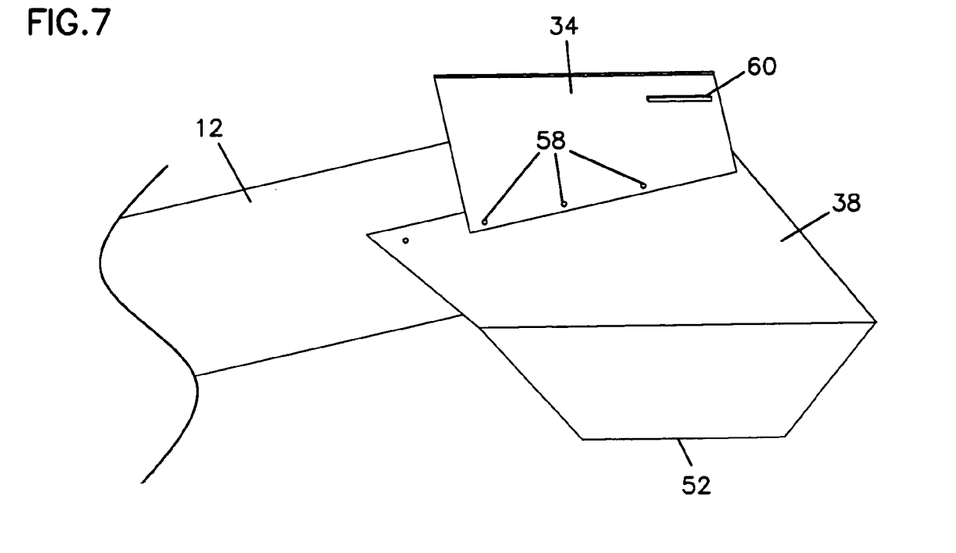
FIG. 7 is a side view of the distal end of the discharge mechanism and interface of FIG. 6, with a drive mechanism mount positioned above the interface.
Figure 8:
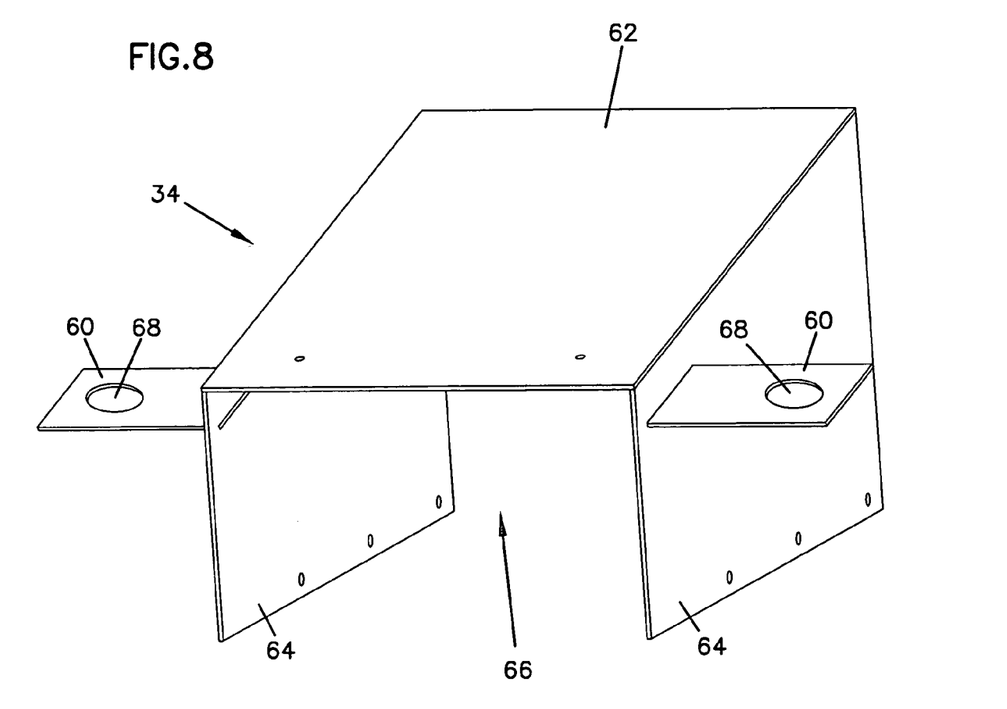
FIG. 8 is a perspective view of the drive mechanism mount of FIG. 7.

FIG. 7 shows mount 34 positioned above distal end 24 of auger 12 and also positioned above interface 38. It may be desirable to have common fasteners such as fasteners 58 mounting both mount 34 and interface 38 to auger 12, although this is not required. Referring now to also to FIG. 8, a pair of tube mounting wings 60 may extend from sides 64 of mount 38 and provide openings 68 through which an upper end of tube mounts 50 extend. An upper mounting plate 62 provides a mounting surface for drive mechanism 36. A u-shaped opening 66 is defined between sides 64 and upper mounting plate 62 for receiving auger 12 and distal end 24.

Figure 9:
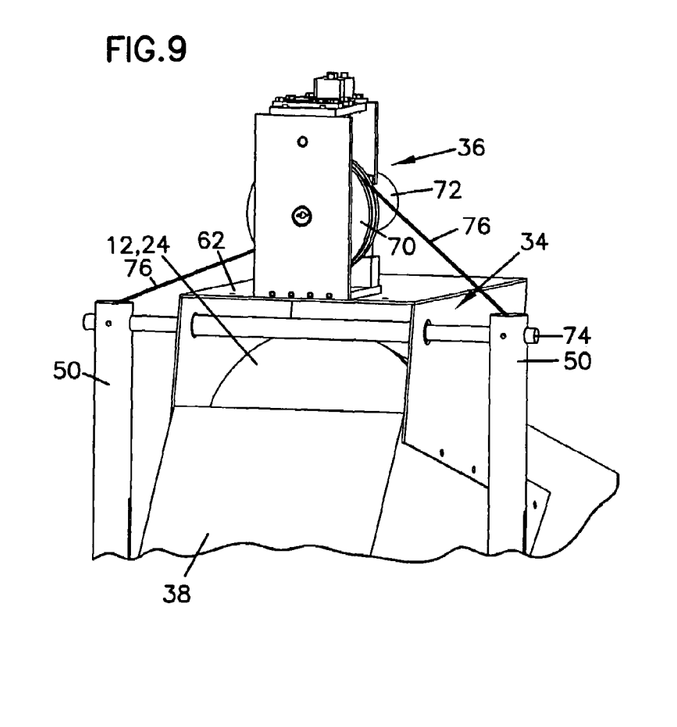
FIG. 9 is a closer view of the distal end of the discharge mechanism and the extendable spout of FIG. 3, with an alternative tube mounting arrangement.

As shown in FIG. 9, an alternative mounting arrangement for tubes 50 may be included in mount 34. In place of wings 60, a pin or bar 74 may extend through sides 64 and engage openings in an upper portion of tube mounts 50. Also shown in FIG. 9 are drive mechanism 36 mounted to upper plate 62. Drive mechanism 36 includes a drum 70 and may also include a motor 72 mounted directly adjacent rum 70. Cables 76 are attached to drum 70 and extend into tubes 50 and down tubes 48 to lower cone 44, where they are attached. Drum 70 rotates to take up cable 76 and draw cones 42, 44 and 46 into the retracted position shown in FIG. 4. Motor 72, as shown, is an electric motor coupled directly or through a geared transmission to drum 70. Alternatively, a pneumatically driven motor may be used in place of electric motor 72, or other means of rotating drum 70 may be substituted. It is desirable that any weight mounted adjacent distal end 24 of auger 12 be kept to a minimum and that the risk of contamination of grain also be minimized.

Figure 10:
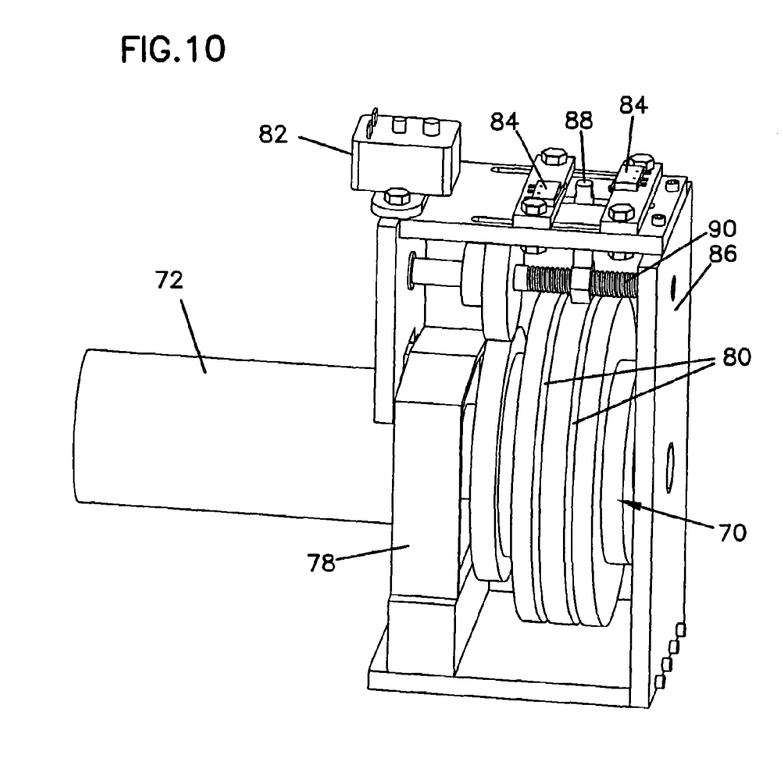
FIG. 10 is a perspective view of the drive mechanism of FIG. 9.

FIG. 10 shows drive mechanism 34 removed from mount 36. A coupling 78 is positioned between and connects drum 70 to motor 72. Drum 70 includes a pair of grooves 80 within which cables 76 may be attached. As cables 76 are rolled onto drum 70 to retract cones 42, 44 and 46, each cable 76 is kept separate from the other cable 76 within one of the grooves. A drum frame 86 is positioned about drum 70.

Mounted on top of drum frame 86 are an electronic motor control or actuator 82 and a pair of limits stop switches 84. Switches 84 cooperate with a position indicator 88 mounted to a threaded shaft coupled to drum 70. As drum 70 rotates to extend or retract cables 76, indicator 88 moves laterally along shaft 90. When indicator 88 contacts either limit stop 84, power to motor 72 is cut off by electronic controller or actuator 82. While this limit indication and control arrangement is configured for use of an electric motor 72, other similar arrangements may be configured to control alternative drive systems. Some form of limit stop arrangement is desirable as spout 24 is remotely actuated from cab 18. Since the operator will preferably be positioned remotely from distal end 24 of auger 12, the operator will not be able to closely monitor operation and position of spout 24. With the limit stop arrangement shown (or an equivalent system), the operator will need only initiate movement of motor 72 and movement will be ended when spout 24 is either fully extended or retracted.

Figure 11:
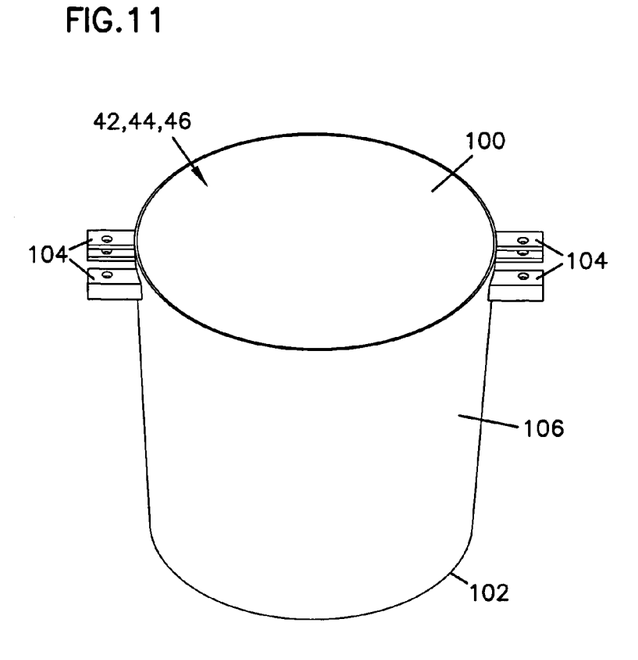
FIG. 11 is a perspective view of a portion of the extendable spout of FIGS. 3 and 4.

Referring now to FIG. 11, cones 42, 44 and 46 are preferably identically configured and include an upper wider end and a lower narrower end. Extending from an outer wall of a body 106 on either side are a pair of tube flange mounts 104. Each of the tubes 48 and 50 include flanges for engaging flange mounts 104 and coupling the tubes to the cones. Upper end 100 and lower end 102 are preferably sized and configured so that one cone may nest within another cone without binding. Preferably, a gap or space will be provided between an inner wall of one cone's body 106 and an outer wall of the other cone's body 106 when the cones are fully nested, as shown in FIG. 4. This will permit stray material such as grain or harvest waste to be tolerated without impairing operation (extension and retraction) of spout 24.

Figure 12:
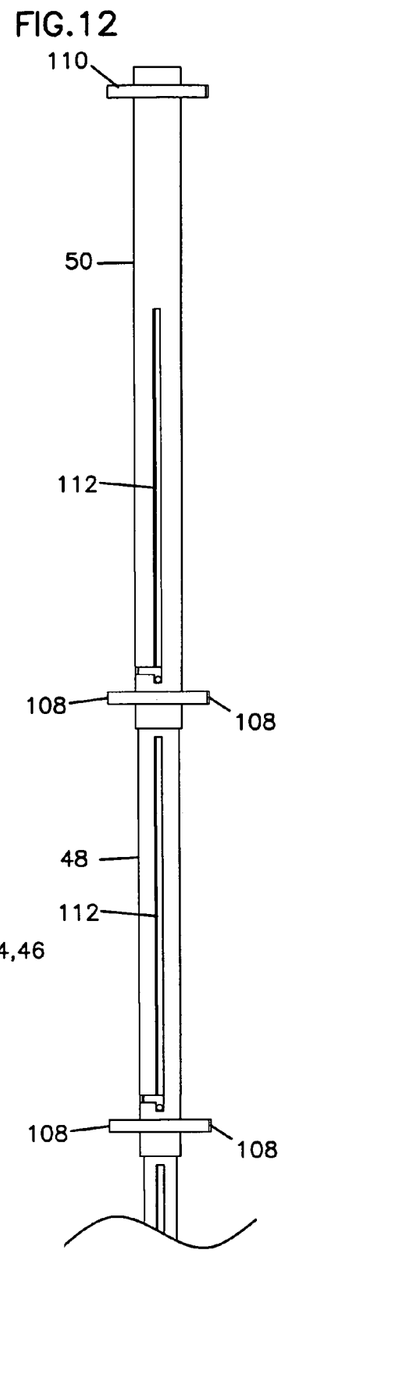
FIG. 12 is a side view of a pair of tubes for mounting to the side of the extendable spout of FIGS. 3 and 4.

In FIG. 12, tubes 48 and 50 both include longitudinally extending slots 112. Tube 50 includes a mounting flange 110 adjacent an upper end for engaging tube mount wings 60. Alternatively, an opening could be provided for pin 74 to extend through. Adjacent a lower end of both tube 50 and tube 48 is a mounting flange 108 configured to engage tube flange mounts 104 of cones 42, 44 and 46, as shown in FIG. 13.

Figure 13:
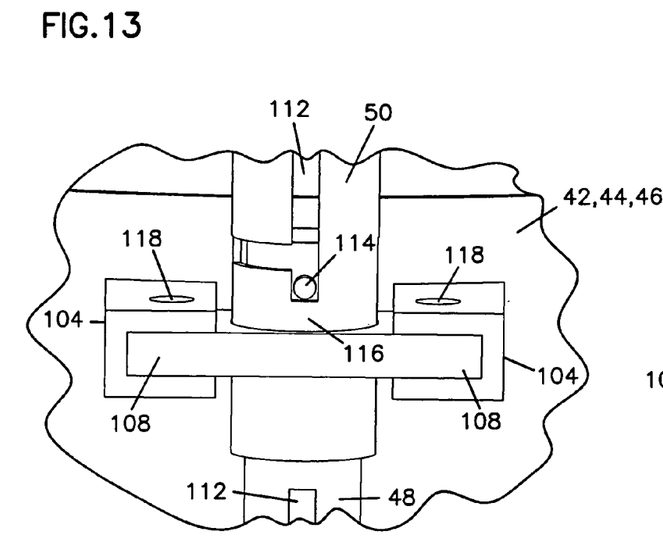
FIG. 13 is a closer perspective view of the tubes of FIG. 12 mounted to the side of the portion of the extendable spout of FIG. 11.

Referring now to FIG. 13, extending radially adjacent a top end of each tube 48 is a stop pin 114. Each of the slots 112 in tubes 48 and 50 includes a closed lower end 116. As cable 76 is extended from drum 70, cones 42, 44 and 46 are allowed to extend toward the extended position shown in FIG. 3. Pins 114 ride within slots 112 and closed ends 116 prevent the nesting cones from extending top far below the next adjacent upper cone and disengaging from spout 24. Openings 118 are provided in tube flange mounts 104 so that engagement of tubes 48 and 50 with cones 42, 44 and 46 may be secured. Any fasteners extended through openings 118 will preferably be removable fasteners such as screws or bolts, so that spout 24 can be disassembled and reassembled for after-market installation, cleaning, repair or maintenance. Similarly, pin 112 is ideally removably mounted within tubes 48 so that the telescoping tubes may be disassembled and reassembled for after-market installation, cleaning, repair or maintenance.

The above specification, examples and data provide a complete description of the manufacture and use of the invention. Since many embodiments of the invention can be made without departing from the spirit and scope of the invention, the invention resides in the claims hereinafter appended.

What is claimed is:

1. An adjustable spout for an agricultural harvester comprising:
   an interface mounted to a distal end of a discharge mechanism of the agricultural harvester;
   a plurality of nesting cones, each cone having a first end and a second end, the plurality of cones including an upper cone, a lower cone and at least one intermediate cone;
      the first end of the upper cone engaging the interface and the interface directing harvested material from the discharge mechanism into the first end of the upper cone;
      the second end of the upper cone slidably received within the first end of one of the at least one intermediate cones, the second end of one of the at least one intermediate cones slidably received within the first end of the lower cone;
      the nesting cones defining a continuous path for harvested material to flow from the discharge mechanism through the second end of the lower cone and slidable within each other between a retracted position and an extended position;
   a drive mechanism coupled to the cones, the drive mechanism moving the nesting cones from the extending position to the retracted position and including an actuator remotely located from the drive mechanism.

2. The adjustable spout of claim 1, the drive mechanism comprising a motor rotating a drum, and at least one cable, the at least one cable connected to the drum and to the lower cone, and wherein rotation of the drum by the drive motor winds the at least one cable about the drum and moves the cones from the extended to the retracted position.

3. The adjustable spout of claim 2, further comprising a motor mount attached to the distal end of the discharge mechanism and the drive mechanism mounted to the motor mount.

4. The adjustable spout of claim 2, further comprising at least one tube connected to each nesting cone, the at least one cable extending within tubes.

5. The adjustable spout of claim 4, wherein the tube of each nesting cone includes an inner diameter greater than the outer diameter of the tube of the next lower adjacent nesting cone, and the tubes telescope within each other when the nesting cones are moved from the extended position to the retracted position.

6. The adjustable spout of claim 5, wherein each tube includes a longitudinal slot extending through a side wall, the slot having a closed lower end adjacent a bottom end of the tube, and wherein each tube includes a radially extending pin adjacent a top end of the tube, the slot of a tube receiving the pin of the tube of the next lower adjacent nesting cone.

7. The adjustable spout of claim 6, wherein each tube includes at least one mounting flange adjacent the top end and each nesting cone includes a connection point to receive the mounting flange to mount the tube to the cone.

8. The adjustable spout of claim 1, wherein the interface is mounted to the distal end of the agricultural harvester and the actuator is located adjacent an operator's position of the agricultural harvester.

9. An agricultural harvester comprising;
   an on-board storage for harvested material;
   a discharge mechanism having a distal end for discharging harvested material from the on-board storage;
   an adjustable length spout comprising a plurality of nested cones, the spout mounted to the distal end of the discharge mechanism, the spout extendable from a retracted position wherein a discharge end of the spout is highest with regard to a ground level and an extended position, wherein the discharge end of the spout is lowest with regard to the ground level;
   a drive mechanism for moving the spout from the extended position to the retracted position;
   an actuator for the drive mechanism located remotely from the drive mechanism and adjacent an operator's position.

10. The harvester of claim 9, the drive mechanism comprises a motor rotating a drum, and at least one cable, the at least one cable connected to the drum and to a lower cone, and wherein rotation of the drum by the drive motor winds the at least one cable about the drum and moves the plurality cones from the extended to the retracted position.

11. The harvester of claim 10, further comprising a motor mount attached to the distal end of the discharge mechanism and the drive mechanism mounted to the motor mount.

12. The harvester of claim 10, further comprising at least one tube connected to each nesting cone, the at least one cable extending within tubes.

13. The harvester of claim 12, wherein the tub of each nesting cone includes an inner diameter greater than the outer diameter of the tube of the next lower adjacent nesting cone, and the tubes telescope within each other when the nesting cones are moved from the extended position to the retracted position.

14. The harvester of claim 9, further comprising an interface mounted to the distal end of the agricultural harvester and the actuator is located adjacent an operator's position of the agricultural harvester.

15. A method of discharging harvested material from a agricultural harvester, the method comprising:
   providing the agricultural harvester with an on-board material storage and a movable discharge mechanism for transferring harvested material from the on-board storage, the discharge mechanism having an adjustable length spout comprising a plurality of nested cones, the spout extending downward from a distal end, the adjustable length spout movable between a retracted position and an extended position, and an operator position located remotely from the discharge mechanism;
   moving the discharge mechanism so that the distal end is positioned above a harvested material receiving receptacle with the spout in the retracted position;
   extending the adjustable length spout to a desired position above the receptacle with an actuator at the operator position;
   discharging harvested material from the on-board storage into the receptacle;
   retracting the spout to the retracted position with the actuator at the operator position.

* * * * *